United States Patent [19]

Uhl et al.

[11] Patent Number: 4,849,262

[45] Date of Patent: Jul. 18, 1989

[54] PIGMENT PRINTING PASTES AND DYEING LIQUORS CONTAINING STABLE DISPERSIONS OF FINELY DIVIDED SOLID POLYISOCYANATES

[75] Inventors: Guenter Uhl, Worms; Rainer Blum; Horst Belde, both of Ludwigshafen, all of Fed. Rep. of Germany

[73] Assignee: BASF Aktiengesellschaft, Ludwigshafen, Fed. Rep. of Germany

[21] Appl. No.: 92,363

[22] Filed: Sep. 2, 1987

Related U.S. Application Data

[63] Continuation of Ser. No. 893,269, Aug. 5, 1986, abandoned.

[30] Foreign Application Priority Data

Aug. 17, 1985 [DE] Fed. Rep. of Germany ....... 3529530

[51] Int. Cl.$^4$ .............. B05D 3/0; C08F 8/30
[52] U.S. Cl. ................. 427/288; 427/389.9; 524/507; 525/124; 525/127; 525/128
[58] Field of Search ............. 427/389.9, 288; 524/501, 507; 525/124, 127, 128, 288

[56] References Cited

U.S. PATENT DOCUMENTS

| | | | |
|---|---|---|---|
| 4,308,184 | 12/1981 | Thoma et al. | 427/381.9 |
| 4,400,497 | 8/1983 | Blum et al. | 528/45 |
| 4,483,974 | 11/1984 | Grögle et al. | 528/68 |
| 4,507,456 | 3/1985 | Blum et al. | 528/44 |
| 4,525,570 | 6/1985 | Blum et al. | 528/44 |

FOREIGN PATENT DOCUMENTS 3109978 1/1982 Fed. Rep. of Germany.
3313237 10/1984 Fed. Rep. of Germany ... 427/389.9

*Primary Examiner*—John C. Bleutge
*Assistant Examiner*—David W. Woodward
*Attorney, Agent, or Firm*—Oblon, Spivak, McClelland, Maier & Neustadt

[57] ABSTRACT

Pigment printing pastes and dyeing liquors containing finely divided solid dispersions of polyisocyanates which have been deactivated on the surface and have a melting point about 25° C. and a particle size of from 0.1 to 15 μm as crosslinking agents in an amount of from 0.1 to 6% by weight. The textile materials printed or dyed with these pastes or liquors, respectively, possess good fastness properties

8 Claims, No Drawings

PIGMENT PRINTING PASTES AND DYEING LIQUORS CONTAINING STABLE DISPERSIONS OF FINELY DIVIDED SOLID POLYISOCYANATES

This is a continuation of application Ser. No. 893,269, filed Aug. 5, 1986, now abandoned.

Processes for producing pigment prints and pigment dyeings on textiles are known. For printing, printing pastes are required which contain, as essential components, a natural or synthetic thickener and/or gasoline emulsified form, and conventional assistants. The essential difference between the dyeing liquors and the printing pastes is that the former do not contain a thickener. For both processes, however, a binder is required in order to bind the pigments to the fabric printed with the printing pastes or dyed with the liquors. The binders are aqueous dispersions of plastics which undergo crosslinking under the fixing conditions and thus become insoluble. These self-crosslinking aqueous plastics dispersions contain, as typical monomers, N-methylolacrylamide, N-methylolmethacrylamide or the corresponding etherified monomers in the form of copolymerized units. In another possible method for textile pigment printing, the self-crosslinking plastics dispersions can be replaced with other dispersions, and these binders can then be crosslinked by adding urea/formaldehyde or melamine/formaldehyde resins and heating to elevated temperatures during fixing. When the stated binders are used, the prints are fixed in each case only with hot air, at relatively high temperatures.

German Laid-Open Application DOS No. 3,109,978 discloses pigment printing pastes for textiles, which contain, in addition to a binder, a pigment, a thickener and, if required, further conventional additives, a water-insoluble, liquid polyisocyanate having a molecular weight of from 364 to 4000, as a characteristic component, in an amount of from 1 to 8% by weight. Although these pigment printing pastes have a shelf life of more than one week, they have poor flow behavior and clog up the printing screens after only a short time.

It is an object of the present invention to improve the fastness properties of pigment dyeings and to provide pigment printing pastes for textiles and dyeing liquors in which dispersions other than self-crosslinking plastics dispersions can be employed as binders. In particular, it is intended to improve the fastness of the pigment dyeings and prints to laundering and to crocking and the flow behavior and stability of the printing pastes.

We have found that this object is achieved, according to the invention, if finely divided solid polyisocyanates which have a melting point above 25° C. and a mean particle size of from 0.5 to 5 μm and whose particle surfaces are deactivated by reacting the isocyanate groups present thereon with compounds which are reactive toward these groups, in the form of stable dispersions in a liquid dispersion medium, are used as crosslinking agents in an amount of from 0.1 to 6% by weight, in pigment printing pastes for textiles and in dyeing liquors.

The preparation of finely divided solid polyisocyanates of the above type is described in, for example, German Laid-Open Applications DOS No. 3,112,054, DOS No. 3,228,670, DOS No. 3,228,724, DOS No. 3,228,723 and DOS No. 3,230,757. This prior art is based on the concept wherein solid polyisocyanates are dispersed in media which are reactive with isocyanates, to give a stable dispersion, and a premature undesirable reaction of the isocyanate groups present in the interior of the particles with the medium is prevented by virtue of the fact that the disperse isocyanates are deactivated on their surface or, to use the terminology of German Laid-Open Application DOS No. 3,230,757, possess retarded reactivity. This deactivation of the particle surfaces or retardation is achieved by virtue of the fact that only those isocyanate groups which are present on the surface of the particles react with the deactivating agent and prevent the polyisocyanate molecules present in the interior of the particle from taking part in the reaction with the substances which are known to react with the isocyanates. After deactivation of the polyisocyanates, stable dispersions are obtained directly by dispersing the particles in a dispersion medium.

Suitable finely divided polyisocyanates are those substances which have a melting point above 25° C., preferably above 40° C. These include alphatic, araliphatic, aromatic and heterocyclic polyisocyanates, polyphenylpolymethylene-polyisocyantes, which are obtained by condensation of aniline and formaldehyde followed by phosgeination, perchlorinated aryl polyisocynates, carbodiimide-containing polyisocyanates, allophanate-containing polyisocyanates, isocyanurate-containing polyisocyanates, urethane-containing or urea-containing polyisocyanates, polyisocyanates containing acylated urea groups, biuret-containing polyisocyanates, polyisocyanates prepared by telomerization reactions, ester-containing polyisocyanates and preferably uretdione-containing diisocyanates and urea-containing diisocyanates. Examples of suitable polyisocyanates of this type are:

| | |
|---|---|
| p-xylylene diisocyanate | mp.: 45–46° C. |
| 1,5-diisocyanatomethylnaphthalene | 88–89° C. |
| 1,3-phenylene diisocyanate | 51° C. |
| 1,4-phenylene diisocyanate | 94–96° C. |
| 1-methylbenzene 2,5-diisocyanate | 39° C. |
| 1,3-dimethylbenzene 4,6-diisocyanate | 70–71° C. |
| 1,4-dimethylbenzene 2,5-diisocyanate | 76° C. |
| 1-nitrobenzene 2,5-diisocyanate | 59–61° C. |
| 1,4-dichlorobenzene 2,5-diisocyanate | 134–137° C. |
| 1-methoxybenzene 2,4-diisocyanate | 75° C. |
| 1-methoxybenzene 2,5-diisocyanate | 89° C. |
| 1,3-dimethoxybenzene 4,6-diisocyanate | 125° C. |
| azobenzene 4,4'-diisocyanate | 158–161° C. |
| diphenyl ether 4,4'-diisocyanate | 66–68° C. |
| diphenylmethane 4,4'-diisocyanate | 42° C. |
| diphenyldimethylmethane 4,4'-diisocyanate | 92° C. |
| naphthalene 1,5-diisocyanate | 130–132° C. |
| 3,3'-dimethylbiphenyl 4,4-diisocyanate | 68–69° C. |
| diphenyldisulfide 4,4'-diisocyanate | 58–60° C. |
| diphenylsulfone 4,4'-diisocyanate | 154° C. |
| 1-methylbenzene 2,4,6-triisocyanate | 75° C. |
| 1,3,5-trimethylbenzene 2,4,6-triisocyanate | 93° C. |
| triphenylmethane 4,4',4''-triisocyanate | 89–90° C. |
| 1,2-(4,4'-diisocyanatodiphenyl)-ethane | 88–90° C. |
| dimeric 1-methyl-2,4-phenylene diisocyanate | 156° C. |
| dimeric 1-isopropyl-2,4-phenylene diisocyanate | 125° C. |
| dimeric 1-chloro-2,4-phenylene diisocyanate | 177° C. |
| dimeric 2,4'-diisocyanatodiphenyl sulfide | 178–180° C. |
| dimeric diphenylmethane 4,4'-diisocyanate | |
| 3,3'-diisocyanato-4,4'-dimethyl-N,N'—diphenylurea | |
| N,N'—bis-[4-(4-isocyanatophenylmethyl)-phenyl]-urea | |
| N,N'—bis-[4-(2-isocyanatophenylmethyl)-phenyl]-urea. | |

Naphthalene 1,5-diisocyanate, 3,3'-diisocyanato4,4'-dimethyl-N,N'-diphenylurea, dimeric 1-methyl-2,4-diisocyanatobenzene, dimeric 4,4'-diisocyanatodiphenylmethane and 3,3'-dimethyl-4,4'-diisocyanatodiphenyl are particularly preferably used.

The polyisocyanates can be deactivated using the methods described in the abovementioned German laid-open applications. Examples of compounds which are suitable for effecting deactivation are those containing hydroxyl, carboxyl, amide and mercapto groups. Compounds of this type form a sort of polymer shell on the surface of the polyisocyanate particles by selectively reacting with the isocyanate groups located on the particle surface. Consequently, the polymer shell is firmly bound to the polyisocyanate particles without substantial proportions of the total amount of isocyanate groups present in the polyisocyanate particles being consumed. Reactions which convert the isocyanate groups to urea or polyurea structures are particularly useful for deactivating the isocyanate groups on the surface of the polyisocyanate particles. Examples of such deactivating agents are water and primary or secondary amines. The particle surfaces of the polyisocyanates can also be deactivated using bifunctional or polyfunctional, low molecular weight or high molecular weight compounds containing aliphatically bonded primary and/or secondary amino groups and/or —CO.NH.NH$_2$ terminal groups and/or hydrazines having a molecular weight of from 32 to about 60,000, preferably from 60 to 3000. These are, for example, low molecular weight and/or high molecular weight primary and/or secondary polyamines, preferably diamines. The amino groups are generally bonded to aliphatic groups, to cycloaliphatic groups or to the aliphatic radical of araliphatic groups. Hydrazine (generally in the form of hydrazine hydrate) or alkyl-substituted hydrazines, such as N,N'-dimethylhydrazine, can also be used. Other compounds which are useful for deactivating the surface of the polyisocyanates are compounds possessing terminal hydrazine groups, eg. dihydrazides, such as oxalodihydrazide, adipodihydrazide, terephthalodihydrazide or compounds containing hydrazide and semicrbazide or, carbazine ester or amino groups, eg. β-semicarbazidoalanylhydrazide, 2-semicarbazidoethylene carbazine ester, aminoacetohydrazide, β-aminopropionohydrazide or ethylene-bis-carbazine ester or ethylene-bis-semicarbazide, as well as polyhydrazides which are obtained by hydrazinolysis of polyacrylates and whose R. Dowbenko and U. T. Hockswender in Organic Coating+Applied Polymer Science 46 (1982), 429–432. However, aliphatic or cycloaliphatic di- and polyamines which, in addition to the amino groups, may furthermore possess OH, tertiary amino, ether, thioether, urethane or urea groups are preferred.

The following di- and polyamines are preferably used: ethylenediamine, 1,2- and 1,3-propanediamine, 1,4-butanediamine, 1,6-hexanediamine, neopentanediamine, 2,2,4- and 2,4,4-trimethyl-1,6-diaminohexane, 2,5-dimethyl-2,5-diaminohexane, 1,10-decanediamine, 1,11-undecanediamine, 1,12-dodecanediamine, bisaminomethylhexahydro-4,7-methanoindan (TCD-diamine), 1,3-cyclohexanediamine, 1,4-cyclohexanediamine, 1-amino-3,3,5-trimethyl-5-aminomethylcyclohexane (isophoronediamine), 2,4- and/or 2,6-hexahydrotoluylenediamine, 2,4'- and 4,4'-diaminodicyclohexylmethane, m- or p-xylylenediamine, bis-(3-aminopropyl)-methylamine, bis-N,N'-(3-aminopropyl)-piperazine, diaminoperhydroanthrazene, 1-amino-2-aminomethyl-3,3,5-(3,5,5)-trimethylcyclopentane, 2,2-dialkylpentene-1,5-diamines and triamines, such as 1,5,11-triaminoundecane, 4-aminomethyl-1,8-diaminooctane, lysine methyl ester, cycloaliphatic triamines as described in German Laid-Open Application DOS No. 2,614,244, 4,7-dioxadecane-1,10-diamine, 2,4- and 2,6-diamino-3,5-diethyl-1-methylcyclohexane and their mixtures, alkylated diaminodicyclohexylmethanes, eg. 3,3'-dimethyl-5,5'-diaminodicyclohexylmethane or 3,5-diisopropyl-3',5'-diethyl-4,4'-diaminodicyclohexylmethane, perhydrogenated diaminonaphthalenes, perhydrogenated diaminoanthrazines and higher amines, such as diethylenetriamine, triethylenetetramine, pentaethylenehexamine, dipropylenetriamine, tripropylenetetramine or N,N'-dimethylethylenediamine, 2,5-dimethylpiperazine, 2-methylpiperazine, piperazine (hydrate) and 2-hydroxyethylpiperazine.

High molecular weight di- and polyamines, as obtainable by, for example, amination of polyoxyalkylene glycols with ammonia as described in Belgian Patent No. 634,741 or U.S. Pat. No. 3,654,370, can also be used in addition to these low molecular diamines or as a mixture with them.

Further very useful high molecular weight polyamines are the commercial substances prepared by polycondensation of polycarboxylic acids, for example polymeric linoleic acid with an excess of di- and triamines. These high molecular weight polyamines have molecular weights of about 400–6000, preferably 400–3000. Because of their composition, such polyamines are particularly useful for producing a nonbrittle, resilient polyurea shell. They are therefore used for deactivating the surface of the polyisocyanate particles, preferably as a mixture with the low molecular weight di- and polyamine compounds.

Any combinations of the stated amine, hydrazine and hydrazide compounds can of course be used, in order, for example, to balance out disadvantageous side effects of one amine with appropriate advantages of other amines (for example low molecular weight and high molecular weight diamines used together) or to combine as many advantageous side effects as possible. Examples of suitable combinations are combinations of rapidly reacting amines, eg. ethylenediamine, with amines which react more slowly as a result of steric hindrance, or of low molecular weight amines or hydrazines with high molecular weight amines, for example aliphatic aminopolyethers.

In order to control and accelerate the deactivation, catalysts may also be added. Preferred catalysts are those which selectively accelerate the deactivation. The deactivation catalysts can, however, also be identical to the catalysts which subsequently accelerate or control the intended heat-activated reaction.

The finely divided solid polyisocyanates can be dispersed in virtually any liquid dispersion medium, for example alcohols, polyols, amines, ethers, ketones, esters, carboxylic acids, aliphatic or aromatic hydrocarbons, halohydrocarbons or water. To use the said polyisocyanates acording to the invention, liquid paraffin, gasoline within a boiling range of from 140° to 250° C., xylene, toluene or water is preferably employed as the dispersion medium. The latter may also be referred to as the deactivating agent if it reacts with the isocyanate groups. This means that the dispersion media which react with isocyanate groups may at the same time be regarded as deactivating agents. The only requirement which the dispersion medium has to meet is that it is liquid at above 20° C.

The known finely divided polyisocyanate dispersions have a very broad particle size distribution and, in this form, are not suitable for use in textile pigment pastes or dyeing liquors. However, they can very easily be converted to a suitable form by bringing them to a mean particle size of from 0.1 to 15, preferably from 0.5 to 5, μm (determined using a Joice Label disk centrifuge). Finely divided polyisocyanate dispersions of this type can be prepared in a very simple manner by subjecting the known dispersions to a fine dispersing procedure or to milling. For example, high speed dissolvers or dispersers of the rotor/stator type or stirred ball mills, bead mills and sand mills, ball mills and slot mills are suitable for this purpose. The finely divided polyisocyanate dispersions used according to the invention are preferably obtained by milling deactivated finely divided solid polyisocyanates. If the polyisocyanates are milled in the presence of substances which react with isocyanate groups, the temperature during milling must not exceed 50° C. Preferably, milling is carried out at from 0° to 40° C., in particular from 10° to 40° C. Surface-active substances or protective colloids may additionally be used during milling, in order to prepare particularly stable polyisocyanate dispersions. Suitable surface-active substances are conventional anionic, cationic or neutral surfactants, eg. sorbitan fatty acid esters, polyoxyethylene sorbitan fatty acid esters, arylsulfonates, alkali metal salts of higher fatty acids, oxyethylated amines, such as oxyethylated oleylamine, sulfosuccinates, soybean lecithin, oxyethylated fatty acid esters, oxypropylated fatty acid esters, and condensates of phenolsulfonic acids, urea and formaldehyde. Viscosity regulators, such as cellulose ethers, methylcellulose, polymeric acids and salts of these acids (eg. polyacrylic acid), natural and synthetic polysaccharides and protein products, cationic starch, polyacrylamides, polyvinyl alcohols and polyvinyl ethers, can also be used.

When the finely divided polyisocyanate dispersions are heated at elevated temperatures, for example of above 60° C., the deactivation of the surface of the polyisocyanate particles is eliminated and the polyisocyanates react with the compounds which are reactive toward them.

The stated polyisocyanate dispersions are used in pigment printing pastes for textiles and in dyeing liquors in an amount of from 0.1 to 6.0, preferably from 0.2 to 1.2, % by weight, based on the solids content of the isocyanate dispersions.

The pigment printing pastes can contain, as binders, the conventionally used self-crosslinking aqueous plastics dispersions. As stated above, these are emulsion polymers which contain, as self-crosslinking monomers, N-methylolacrylamide, N-methylolmethacrylamide or the corresponding etherified monomers in the form of copolymerized units. Dispersions of this type are available commercially. They contain, as the principal monomers, styrene and acrylates or vinyl acetate and acrylic acid or methacrylates, or styrene and butadiene or butadiene and acrylates in the form of copolymerized units. The selfcrosslinking, film-forming copolymers may be modified with an ethylenically unsaturated $C_3$-$C_5$-carboxylic acid, eg. acrylic acid, methacrylic acid, crotonic acid, maleic acid or fumaric acid, in an amount of from 0.5 to 10% by weight, in the form of copolymerized units, or may contain, as further polymerized comonomers, vinyl ethers, vinyl ketones, vinyl chloride, vinylidene chloride, vinyl propionate and/or acrylonitrile. The self-crosslinking copolymers are present in the printing pastes or dyeing liquors as binders in an amount of from 0.45 to 25, preferably from 2.4 to 12, % by weight, based on the solids content of the dispersion.

The said polymers contain from 0.3 to 12, preferably from 1.5 to 6, % by weight of copolymerized monomers which react with isocyanate groups. These are in the form of N-methylol groups and carboxyl groups.

The advantage of the present invention is that it is no longer necessary to depend entirely on the self-crosslinking film-forming binders which have been used to date for pigment printing, but, in addition to these known self-crosslinking binders, or as a mixture with them, it is possible to use polymers which contain functional groups which react with isocyanates. Examples of suitable binders for these pigment printing pastes are polymers which possess the following functional groups: hydroxyl, carboxyl, carboxamide, NH and $NH_2$ groups. In order to achieve adequate crosslinking during fixing of the textile printing pastes, the binder must contain from 0.3 to 12, preferably from 1.5 to 6, % by weight of these groups. Examples of monomers containing functional groups are acrylic acid, acrylamide, hydroxyethyl acrylate, hydroxypropyl acrylate, butanediol monoacrylate, methacrylic acid, crotonic acid, itaconic acid and all the derivatives of methacrylic acid, of crotonic acid and of itaconic acid which are similar to the stated derivatives of acrylic acid. These monomers which are copolymerizable with one another can be used to prepare a large number of binders which can be crosslinked according to the invention with the polyisocyanate dispersions. Examples of suitable compounds are polyacrylic acids, polymethacrylic acids, copolymers of acrylic acid and acrylates, copolymers of acrylamide and acrylic acid, and copolymers of acrylamide and hydroxyethyl acrylate. These copolymers can be copolymerized with other monomers which are copolymerizable with them and do not contain any functional groups which react with isocyanate groups. In contrast to the conventional self-crosslinking binders, the binders containing functional groups may not be in the form of dispersions. Although these binders may be used in the form of their dispersion, it is also possible to employ aqueous solutions of these binders. These binders should contain a sufficient number of polar groups to permit them to be dispersed or dissolved in water without an assistant. Examples of suitable compounds are polyvinyl alcohol, partially hydrolyzed polyvinyl acetate, hydroxyethylcellulose and hydroxymethylcellulose.

Another important component of the pigment printing pastes comprises the pigments which are conventionally used and which are listed in, for example, the Color Index. The pigments are present in the printing inks or dyeing liquors in an amount of from 0.01 to 40, preferably from 1 to 25, % by weight. In principle, any insoluble inorganic or organic colored substance which is usually employed as a pigment can be used. Examples of known pigments are titanium dioxide and carbon black. For producing pigment colorations, the pigment is used in an amount of from 0.01 to 4, preferably from 0.1 to 1.5, % by weight.

Thickeners are an important component of pigment printing pastes for textiles. These thickeners are natural or synthetic thickeners or gasoline emulsions. Examples of natural thickeners are tragacanth, alginates, locust bean meal and carragheen moss.

Suitable synthetic thickeners are high molecular weight polymers based on ethylenically unsaturated $C_3$-$C_5$-carboxylic acids, in particular acrylic acid. These polymers can contain, as copolymerized units, small amounts of an ethylenically unsaturated monomer possessing two double bonds. Other suitable substances for this purpose are copolymers of ethylene and maleic anhydride and mixtures of various synthetic thickeners. The thickeners are present in the pigment printing pastes in an amount of from 0 to 16, preferably from 0.55 to 2.0, % by weight. When the pigment printing pastes contain gasoline in emulsified form as a thickener, the amount of gasoline is from 50 to 70% by weight. It is of course also possible to use mixtures of a synthetic thickener and a gasoline emulsion or a mixture of a natural thickener and a gasoline emulsion. In addition to containing the abovementioned components, the printing pastes and dyeing liquors contain water to make up to 100% by weight, the sum of the percentages being 100 in each case. As a rule, the aqueous dyeing liquors do not contain a thickener. Further conventional additives for printing pastes and dyeing liquors are emulsifiers, plasticizers, silicone oils, silicates, urea, glycols and urea/formaldehyde and melamine/formaldehyde resins. These substances can be present in the printing pastes or dyeing liquors in an amount of up to 10% by weight.

The printing pastes are obtained by mixing the individual components. This can be done by first preparing an emulsion thickener by, for example, stirring a solid synthetic thickener and an emulsifier into water, allowing them to swell or to dissolve and, if necessary, then emulsifying them with heavy naphtha, while stirring. A binder and the polyisocyanate dispersion used according to the invention are then added to give a paste, into which the pigment is then stirred. The paste can be diluted with water and may be stirred with further additives. If the viscosity of the paste is too low, further thickener is added. The printing pastes can be applied with the aid of the conventional printing methods, for example roller printing, screen printing, film printing and rotary film printing. The printing pastes are used to print textiles in the form of woven fabric, knitted fabric or webs of any natural, synthetic or cellulosic fibers. These may be textile materials of wool, cotton, linen, rayon staple, silk, artificial silk, polyester, nylon, polyacrylonitrile or blends of these types of fibers. The pigment dyeing liquors are used in the same way. After the printing process, the printing pastes are fixed on the printed material by means of a heat treatment at about 100° C. Fixing may be effected either with steam or with hot air. Although superheated steam can be used, it is not essential. The fixing process requires about 3–6 minutes. Fixing is of course also necessary for pigment colorations. Both in printing and in dyeing, better fastness properties are achieved compared with the prior art. The polyisocyanate dispersions in the printing paste or dyeing liquor act as crosslinking agents and react with the soluble components of the printing paste which possess functional groups which react with isocyanates. The printing pastes can still be used even after storage for several weeks and exhibit good flow behavior during printing. In contrast to the known, liquid isocyanate-containing printing pastes, the novel pigment printing pastes do not clog up the printing screens.

In the Examples which follow, parts and percentages are by weight.

Crosslinking agent 1

30 g of pulverulent toluylene diisocyanate dimerize via urethdione groups, 4 g of a commercial polyamidoamine having an amine number of 400 and 66 g of liquid paraffin are mixed at room temperature and are stirred in a stirred ball mill at from 20° to 25° C. for one hour using hard glass beads having a diameter of from 0.6 to 0.8 mm. In the resulting finely divided stable polyisocyanate dispersion, the particle surfaces are deactivated and the particle size is from 0.9 to 1.5 μm. The melting point of the polyisocyanate is about 170° C.

Crosslinking agent 2

1653 parts of a commercial polyamidoamine having an amine number of 400 are dissolved in 4500 parts of water. 5500 parts of pulverulent toluylene diisocyanate dimerized via urethdione groups and having a melting point of about 170° C. are added, and the mixture is subjected to a shearing field in a dissolver for 4 minutes to give an aqueous polyurethane dispersion which has a pronounced tendency to settle out.

2500 parts of the aqueous polyisocyanate dispersion are combined with a solution of 4 parts of a commercial polysaccharide having a high molecular weight and 117 parts of a commercial condensate of phenolsulfonic acid, urea and formaldehyde in 1272 parts of water, and the mixture is further dispersed for 20 minutes at from 20° to 25° C. in a cooled open stirred ball mill. This gives a dispersion having a greatly reduced mean particle size of from 0.5 to 2 μm.

EXAMPLE 1

The following components are stirred, in succession, into 76 parts of an oil-in-water emulsion obtained by emulsifying 75% of gasoline (boiling range from 140° to 220° C.) in a solution of 1% of hydroxyethylcellulose, 1% of diethylene glycol and 1% of an adduct of 12 moles of ethylene oxide with 1 mole of p-benzyl-o-phenylphenol in 22% of water: 1 part of silicone oil having a viscosity of 5000 mPa.s, 14 parts of a 40% strength aqueous dispersion of a copolymer of 86% of butyl acrylate, 3% of acrylamide, 10% of acrylonitrile and 1% of hydroxyethyl acrylate, 3 parts of a 35% strength aqueous preparation of the yellow pigment of Color Index No. 21108 and 6 parts of crosslinking agent 2. A cotton/polyester blended fabric is then printed with the printing paste described above by a flatbed printing method, and is dried and fixed with hot air for 5 minutes at 140° C. Prints having very good fastness properties are obtained.

EXAMPLE 2

1.5 parts of a high molecular weight copolymer which consists of 95% of acrylic acid and 5% of acrylamide in gasoline and has been neutralized with ammonia, are stirred into 79.3 parts of water. The following components are then stirred, in succession, into the thickener obtained in this manner: 2 parts of trisstearyl citrate,
12 parts of a 40% strength aqueous dispersion of a copolymer of 40% of butyl acrylate, 52.5% of ethyl acrylate, 3% of hydroxypropyl acrylate and 4.5% of N-methylolmethacrylamide,
0.5 part of tallow fatty alcohol which has been reacted with 25 moles of ethylene oxide,
1 part of ethylhexyl phthalate,
2.5 parts of a 35% strength aqueous pigment paste obtained from the pigment of Color Index No. 60005 (violet pigment) and
1.2 parts of crosslinking agent 2.

A cotton batiste printed in a conventional manner with this paste and dried for 3 minutes at 130° C. exhibits very good fastness properties.

EXAMPLE 3 parts of an aqueous copolymer dispersion which contains, as copolymerized units, 93% of butyl acrylate, 3% of acrylonitrile, 1% acrylic acid and 3% of N-methylolmethacrylamide, 2.5 parts of a 36% strength aqueous orange pigment paste of the pigment of Color Index No. 21115 and 2 parts of crosslinking agent 2 are added, while stirring, to 83.5 parts of a 4.5% strength aqueous thickener which consists of a 25% strength high molecular weight copolymer of 92% of acrylic acid and 8% of acrylamide and has been neutralized with A cotton fabric is printed with this printing paste by the roller printing method, then dried and fixed ith superheated steam at 160° C. for 60 seconds. A print possessing good fastness properties is obtained.

EXAMPLE 4

0.75 part of an ethylene/maleic acid copolymer having a molecular weight greater than 500,000 is stirred 80.35 parts of water.

1.0 part of a 25% strength aqueous ammonia solution is then added, after which the following components are stirred in one after the other:

parts of a 40% strength aqueous dispersion of a copolymer of 87% butyl acrylate, 10% of acrylonitrile and 3% of hydroxypropyl acrylate, 1.4 parts of crosslinking agent 2 and 2.5 parts of a 35% strength aqueous preparation, of the red pigment of Color Index No. 12370.

This printing paste is then used to print a rayon staple fabric. The print is dried, and then fixed with hot air for 3 minutes at 100° C. A print possessing very good fastness properties is obtained.

EXAMPLE 5

0.65 part of a partially crosslinked high molecular weight polyacrylic acid is stirred into 80.35 parts of water and neutralized with ammonia. The following components are stirred, in succession, into the resulting thickener:

parts of a 50% strength aqueous dispersion of a copolymer of 82.5% of butyl acrylate, 10% of ethyl acrylate, 3% of acrylonitrile, 1% of acrylic acid and 3.5% of N-methylolmethacrylamide, 0.5 part of a bis-2,4-xylenol glycerol ether which has been reacted with 20 moles of ethylene oxide, 1 part of silicone oil, 3 parts of a 30% strength aqueous dye paste of copper phthalocyanine green and finally 1.5 parts of crosslinking agent 1.

This printing paste is used to print a nylon fabric on a flatbed printing machine in a conventional manner, and the print is dried and fixed at 100° C. for 4 minutes. A print possessing good fastness properties is obtained.

EXAMPLE 6

200 parts of a 30% strength aqueous solution of a polymer consisting of 75.8% of butyl acrylate, 14.2% of acrylic acid and 10% of hydroxypropyl acrylate and having a K value of 20, determined by the Fikentscher method at 250° C. in a 1% strength aqueous solution, are mixed with 35 parts of water and 25 parts of a 90% strength aqueous solution of bis-2,4-xylenol glycerol ether which has been reacted with 20 moles of ethylene oxide per mole. This mixture is emulsified with 740 parts of gasoline within the boiling range of from 140 to 220° C.

2.5 parts of a 36% strength aqueous dye paste of the orange pigment of Color Index No. 71105 and 4 parts of crosslinking agent 2 are stirred in succession into 93.5 parts of the highly viscous emulsion thus obtained.

The resulting printing paste is used to print a cotton fabric, the fabric is dried at 80° C. and the print is fixed for 5 minutes at 130° C. with hot air. A print possessing good fastness properties is obtained.

EXAMPLE 7

20 parts of a 10% strength aqueous solution of polyvinyl alcohol and 0.5 part of a lauryl alcohol which has been reacted with 20 moles of ethylene oxide are added to 9 parts of a 60% strength aqueous preparation of ammonium polyacrylate having a molecular weight of 3,000,000. 2 parts of an aqueous paste of the orange pigment of Color Index No. 71105, 3.75 parts of crosslinking agent 2 and 64.75 parts of water are introduced into this thickener, while stirring. This printing paste is then used to print a cotton/polyester blended fabric by the film printing method, the fabric is dried at 80° C. and the print is fixed for 6 minutes at 130° C. with hot air. A print possessing good fastness properties is obtained.

EXAMPLE 8

The following components are stirred, in succession, into 40 parts of a 3% strength aqueous commercial high molecular weight hydroxyethylcellulose:

3 parts of a 40% strength preparation of copper phthalocyanine blue of Color Index No. 74160, 3.75 parts of crosslinking agent 2 and 53.75 parts of water.

The resulting printing paste is then used to print a cotton twill by the rotary film printing method, the twill is dried at 80° C. and the print is fixed for 5 minutes with hot air at 120° C. A print having good fastness properties is obtained.

EXAMPLE 9

The following components are stirred in succession into 42 parts of a 5% strength aqueous thickener consisting of a commercial locust bean ether gum:

2.5 parts of a 32% strength paste of phthalocyanine green of Color Index No. 74260, 1 part of castor oil, 3.5 parts of crosslinking agent 2 and 51 parts of water.

The resulting printing paste is used to print on a cotton satin in a conventional manner by the film printing method. The print is dried at 80° C. and then fixed with hot air at 140° C. in the course of 5 minutes. A print having good fastness properties is obtained.

EXAMPLE 10

One part of an adduct of bis-2,4-xylenol glycerol ether with 18 moles of ethylene oxide and 20 parts of a 25% strength aqueous solution of polycaprolactam whose nitrogen atoms have been reacted with, on average, 3.2 moles of ethylene oxide and which has a molecular weight of about 2000 are added to 18 parts of water. 61 parts of gasoline within a boiling range of from 140 to 220° C. are mixed into this solution using a high speed stirrer. A highly viscous emulsion is obtained in this manner.

2.5 parts of a 40% strength aqueous dye paste of the red pigment of Color Index No. 12385 and 4 parts of crosslinking agent 2 are stirred into 93.5 parts of the above emulsion.

The printing paste produced in this manner is used to print a cotton batiste by the flatbed printing method, the printed material is dried and the print is fixed in the course of 6 minutes with superheated steam at 170° C. A print possessing good fastness properties is obtained.

EXAMPLE 11

8 parts of an epoxide/amine adduct which has been modified with stearic acid and has a molecular weight of 3000 and a base number of 120 mg of KOH per g of solid product are neutralized with acetic acid and then mixed with 1 part of a bis-2,4-xylenol glycerol ether, which has been reacted with 18 moles of ethylene oxide, and 25.3 parts of water. This mixture is then emulsified with 65.7 parts of gasoline within the boiling range of from 140° to 20° C. using a high speed stirrer. A highly viscous emulsion is obtained. 4.5 parts of crosslinking agent 2 and 2 parts of a 35% strength aqueous dye paste of the red pigment of Color Index No. 12370 are stirred, in succession, into 93.5 parts of the emulsion thus obtained. The resulting printing paste is used to print a cotton fabric, the fabric is dried at . . .° C. and the print is then fixed for 5 minutes at 175° C. with superheated steam. A print which has good fastness to boil washes and good fastness to crocking is obtained, the printed material having a very soft feel.

EXAMPLE 12

13.4 parts of water are mixed with one part of bis-2,4-xylenol glycerol ether, which has been reacted with 18 moles of ethylene oxide, and 20 parts of a 25% strength aqueous solution of the sodium salt of a solution polymer of 5% of acrylic acid, 87% of methyl acrylate and 8% of acrylonitrile. This mixture is then emulsified with 65.6 parts of gasoline within a boiling range from 140° to 220° C., using a high speed stirrer. A highly viscous emulsion is obtained. 2 parts of crosslinking agent 2 and 2 parts of a 35% strength aqueous dye paste of the yellow pigment of Color Index No. 20040 are then stirred into 96 parts of this emulsion. The resulting printing paste is used to print a cotton cretonne by the roller printing method, the cretonne is dried and the print is fixed for 5 minutes at 140° C. with hot air. A print having good fastness to boil washes and to crocking coupled with a very soft feel is obtained.

EXAMPLE 13

80 parts of a 40% strength aqueous dispersion of a copolymer of 85% of butyl acrylate, 8% of acrylonitrile, 3% hydroxypropyl acrylate and 4% of N-methylolmethacrylamide, 15 parts of crosslinking agent 2 and 2 parts of a 38% strength aqueous preparation of phthalocyanine blue of Color Index No. 74160 are stirred in succession into 903 parts of water. The resulting dyeing liquor is used to pad a cotton fabric, the fabric is dried at from 100° to 110° C. and the print is then fixed at 150° C. with hot air. A dyeing having very good fastness to laundering and to crocking is obtained.

We claim:

1. A process for printing textiles, comprising the steps of:
   (i) printing a textile material with a print paste, by transferring said print paste to the textile material from a printing means, said print paste consisting essentially of:
   (a) 3–35 wt. % of a binder, said binder consisting essentially of a 15–55% solids by weight aqueous dispersion or solution of a polymer which is film-forming at least under fixing conditions of from 100°–200° C., wherein said polymer comprises from 0.3–12 wt. % of a monomer unit containing one or more groups which are reactive toward isocyanate, said groups being selected from the group consistng of hydroxyl, carbonyl, carboxamide, NH and NH$_2$ groups,
   (b) from 0.01–40 wt. % of a pigment.
   (c) from 0.55–16 wt. % of a thickener or from 50–70 wt. % of gasoline,
   (d) a cross-linking agent in the form of a stable dispersion in a liquid dispersion medium, comprising form 0.1–6 wt. % of a finely divided solid polyisocyanate having a melting point above 40° C. and a particle size from 0.1–15 micron, and wherein the particle surfaces have deactivated by reacting the isocyanate groups present on said particles with compounds which are reactive toward isocyanate groups,
   (e) from 0–10 wt.% of conventional additives, and
   (f) the balance water up to 100 wt. %; and
   (ii) drying the textile material and fixing said paste at about 100° C. or above.

2. The process of claim 1, wherein said crosslinking agent is a dispersion containing from 5–60 wt. % of a polyisocyanate in aliphatic or aromatic hydrocarbons which are liquid at 20° C.

3. The process of claim 1, wherein said crosslinking agent is a dispersion containing from 5–60 wt. % of a polyisocyanate in liquid paraffin.

4. The process of claim 1, wherein said crosslinking agent is a dispersion containing from 5–70% by weight of a polyisocyanate in water.

5. The process of claim 1, wherein said polyisocyanate is a diisocyanate containing uretdione groups.

6. The process of claim 1, wherein said polyisocyanate is toluylene diisocyanate which is dimerized via uretdione groups.

7. The process of claim 1, wherein said polyisocyanate is selected from the group consisting of naphthalene-1,5-diisocyanate; 3,3'-diisocyanato-4,4'-dimethyl-N,N'-diphenylurea; dimeric 1-methyl-2,4-diisocyanatobenzene; dimeric 4,4'-diisocynatodiphenylmethane and 3,3'-dimethyl-4,4'-diisocyanatodiphenyl.

8. The method of claim 1, wherein said polyisocyanate is selected from the group consisting of p-xylylene diisocyanate, 1,5-diisocyanatomethylnaphthalene, 1,3-phenylene diisocyanate, 1,4-phenylene diisocyanate, 1-methylbenzene 2,5-diisocyanate, 1,3-dimethylbenzene 4,6-diisocyanate, 1,4-dimethylbenzene 2,5-diisocyanate, 1-nitrobenzene 2,5-diisocyanate, 1,4-dichlorobenzene 2,5-diisocyanate, 1-methoxybenzene 2,4-diisocyanate, 1-methoxybenzene, 2,5-diisocyanate, 1,3-dimethoxybenzene 4,6-diisocyanate, azobenzene 4,4'-diisocyanate, diphenyl ether 4,4'-diisocyanate, diphenylmethane 4,4'-diisocyanate, diphenyldimethylmethane 4,4'-diisocyanate, naphthalene 1,5-diisocyanate, 3,3'-dimethylbiphenyl 4,4'-diisocyanate, diphenyldisulfide 4,4'-diisocyanate, diphenylsulfone 4,4'-diisocyanate, 1-methylbenzene 2,4,6-triisocyanate, 1,3,5-trimethylbenzene 2,4,6-triisocyanate, triphenylmethane 4,4',4"-triisocyanate, 1,2-(4,4,'-diisocyanatodiphenyl)-ethane, dimeric 1-methyl-2,4-phenylene diisocyanate, dimeric 1-isopropyl -2,4-phenylene diisocyate, dimeric 1-chloro-2,4-phenylene diisocyanate, dimeric 2,4'-diisocyanatodiphenyl sulfide, dimeric diphenylmethane 4,4'-diisocyanate, 3,3'-diisocyanato-4,4'-dimethyl-N,N'-diphenylurea, N,N'-bis[4-(4-isocyanatophenylmethyl)-phenyl]-urea, and N,N'-bis[4-(2-isocyanatophenylmethyl)-phenyl]-urea.

* * * * *